United States Patent [19]
Marola

[11] Patent Number: 5,163,803
[45] Date of Patent: Nov. 17, 1992

[54] TRUCK TOWING BOOM

[75] Inventor: Martin A. Marola, Goshen, Conn.

[73] Assignee: Tru-Hitch, Incorporated, Torrington, Conn.

[21] Appl. No.: 670,248

[22] Filed: Mar. 15, 1991

[51] Int. Cl.$^5$ .............................................. B60P 3/12
[52] U.S. Cl. ...................................... 414/563; 280/402
[58] Field of Search ................. 280/402, 425.2, 441.2; 414/563

[56] References Cited

U.S. PATENT DOCUMENTS

| 4,384,817 | 5/1983 | Peterson | 414/563 |
| 4,423,885 | 1/1984 | Camey et al. | 280/441.2 |
| 4,434,993 | 3/1984 | Curtis | 414/563 X |
| 4,797,058 | 1/1989 | Bilas | 414/563 |
| 4,840,534 | 6/1989 | Totty | 414/563 |
| 4,842,472 | 6/1989 | Plant | 414/563 |
| 4,861,221 | 8/1989 | Krisa | 414/563 |

Primary Examiner—Michael S. Huppert
Assistant Examiner—James Keenan
Attorney, Agent, or Firm—Chilton, Alix & Van Kirk

[57] ABSTRACT

A boom assembly attaches to the fifth wheel of a tractor for towing a truck or other vehicle. The assembly has a main frame with a pair of uprights and a pair of pivotally mounted legs. The vehicle is secured at longitudinal spaced locations to the legs. Hydraulic cylinders are actuated to force the legs to a pivoted position which lifts the legs and the towed truck to an elevated position for towing.

21 Claims, 11 Drawing Sheets

TRUCK TOWING BOOM

BACKGROUND OF THE INVENTION

This invention relates generally to devices which are employed for towing vehicles. More particularly, the present invention relates generally to devices which mount to the fifth wheel of a tractor and are adapted for towing a truck.

A number of boom assemblies are specifically adapted for attachment to a truck for purposes of towing a truck or other large vehicle. A number of such assemblies are specifically adapted for mounting to the fifth wheel of a tractor so that the tractor provides the motive power for towing the vehicle. Many of the prior art boom assemblies function to lift the front end of the truck at a relative position wherein a significant downward force is applied to the rear of the tractor during the towing process. The downward force tends to pivot the frame of the tractor about the rear axles. The front end of the tractor is consequently "lightened" or tends to lift. In extreme cases, safe operation of the towing vehicle is jeopardized due to the light front end.

Various devices to which the patent relates are disclosed in the following references which are identified below by patentee and U.S. Pat. No.:

| Patentee | U.S. Pat. No. |
| --- | --- |
| Krisa | 4,861,221 |
| Plant | 4,842,472 |
| Bilas | 4,797,058 |
| Morton | 4,555,214 |
| Hubert | 4,544,175 |
| Skala et al | 4,149,643 |
| Flaugh | 4,316,617 |
| Parkes | 4,047,733 |
| Mosling | 2,325,869 |

SUMMARY OF THE INVENTION

Briefly stated, the invention in a preferred form is a truck towing boom assembly which comprises a main frame including a pair of laterally spaced beams and a pair of spaced uprights extending generally perpendicularly to the beams. An assembly for attaching the assembly to the fifth wheel of the vehicle is mounted to the beams. A pair of lift legs are pivotally mounted at a lower portion of the uprights and are preferably configured in telescopic relationship. A pair of hydraulic cylinders connect between the main frame and the lift legs. The hydraulic cylinders function to pivot the legs at a folded position wherein the legs and uprights are substantially parallel, a second extended position wherein the legs essentially rest on the road for attachment to the truck when the main frame is mounted to a fifth wheel, and a third extended position wherein the angle between the main frame and the lift legs is greater than that of the second position. At the third pivot position, the legs are forced to an elevated position above the road when the legs are appropriately secured to the frame of the truck. A variably positionable receiver is mountable to the underside of the front wheel portion of the truck for securing same to the support legs. A second securement assembly at the terminus of the telescopic legs secures an upper portion of the truck frame to the lift legs. A lock assembly, which may be a telescopic tubular structure, locks the legs and the main frame at the third pivot position during towing.

An object of the invention is to provide a new and improved truck towing boom assembly which is mountable to a fifth wheel of a tractor.

Another object of the invention is to provide a new and improved truck towing boom assembly which is adaptable for attachment to the frame of a vehicle in a relatively easy and efficient manner and is easily transformable to a towing mode.

A further object of the invention is to provide a new and improved truck towing boom assembly which mounts to a fifth wheel and attaches to the towed vehicle in a positional and force distribution relationship wherein the towed vehicle does not exert a substantial downward force tending to upwardly pivot the front of the tractor about the rear axles.

A yet further object of the invention is to provide a new and improved truck towing boom assembly which can be efficiently transported and/or stored in an efficient manner when the assembly is not being used.

Other objects and advantages of the invention will become apparent from the drawings and the specification.

DETAILED DESCRIPTION OF THE PREFERRED EMBODIMENT

With reference to the drawings wherein like numerals represent like parts throughout the several figures, a truck towing boom assembly in accordance with the present invention is generally designated by the numeral 10. The boom assembly is adapted to mount to a fifth wheel 12 of a tractor 14 for towing a disabled truck 16. The boom assembly 10 has application in connection with towing trucks of various sizes and configurations as well as other vehicles.

Figure 1:
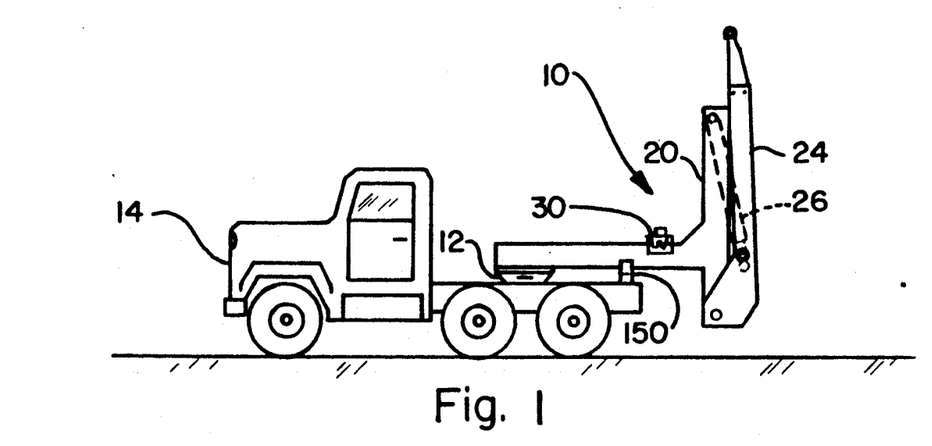
FIG. 1 is a side elevational view of a tractor and a truck towing boom assembly illustrated in a non-towing mode.
Figure 2:
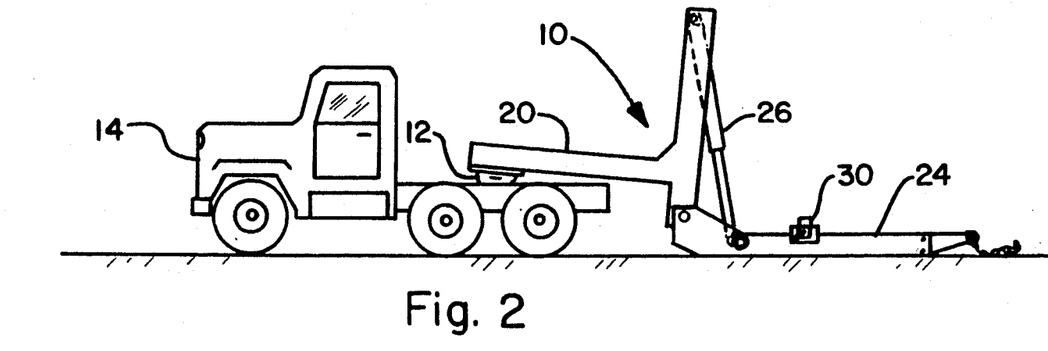
FIG. 2 is a side elevational view of the tractor and boom assembly of FIG. 1, wherein the boom assembly is illustrated in a position for attachment to a truck.
Figure 3:
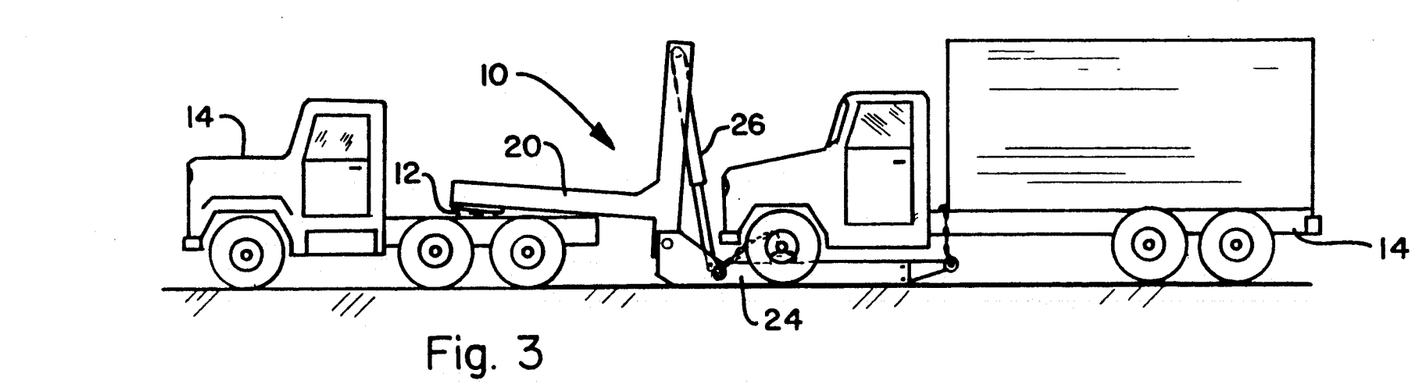
FIG. 3 is a side elevational view of the truck and boom assembly of FIG. 1 further illustrating attachment of a truck to the boom assembly.

The boom assembly 10 is mountable to the fifth wheel 12 when required and may be easily dismounted for storage purposes. The mounted boom assembly 10 is foldable to a non-towing transportation mode illustrated in FIG. 1. When the tractor 14 and mounted boom assembly 10 arrive at the location of the vehicle which is to be towed, the boom assembly is extended to the position of FIG. 2 wherein the lower portion of the boom assembly rests on the road or ground and is positioned at the underside of the frame of the truck 16. The truck is then secured to the boom assembly as illustrated in FIG. 3. The boom assembly is then transformed to the towing configuration illustrated in FIG. 4 wherein the boom assembly is elevated from the road or ground, and the truck is in condition for towing by the tractor.

Figure 5:
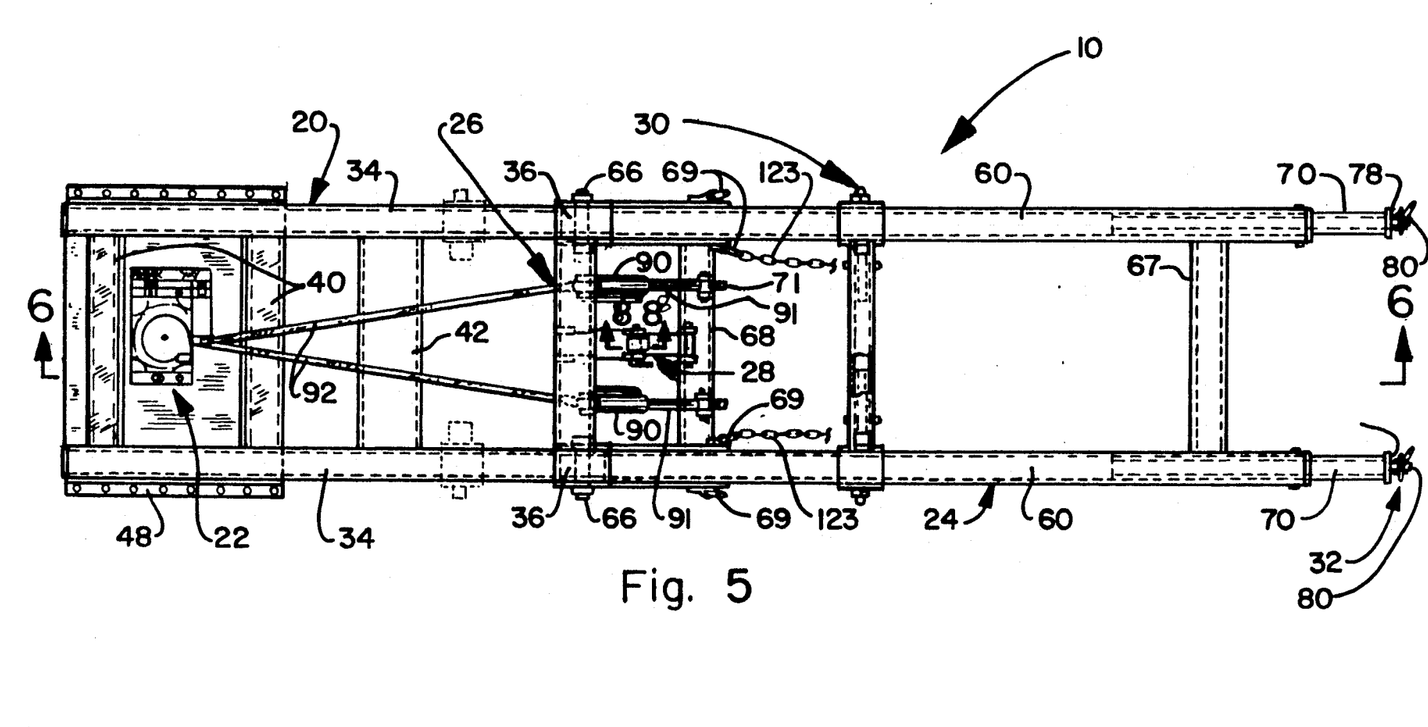
FIG. 5 is a top plan view of the boom assembly of FIG. 2.
Figure 6:
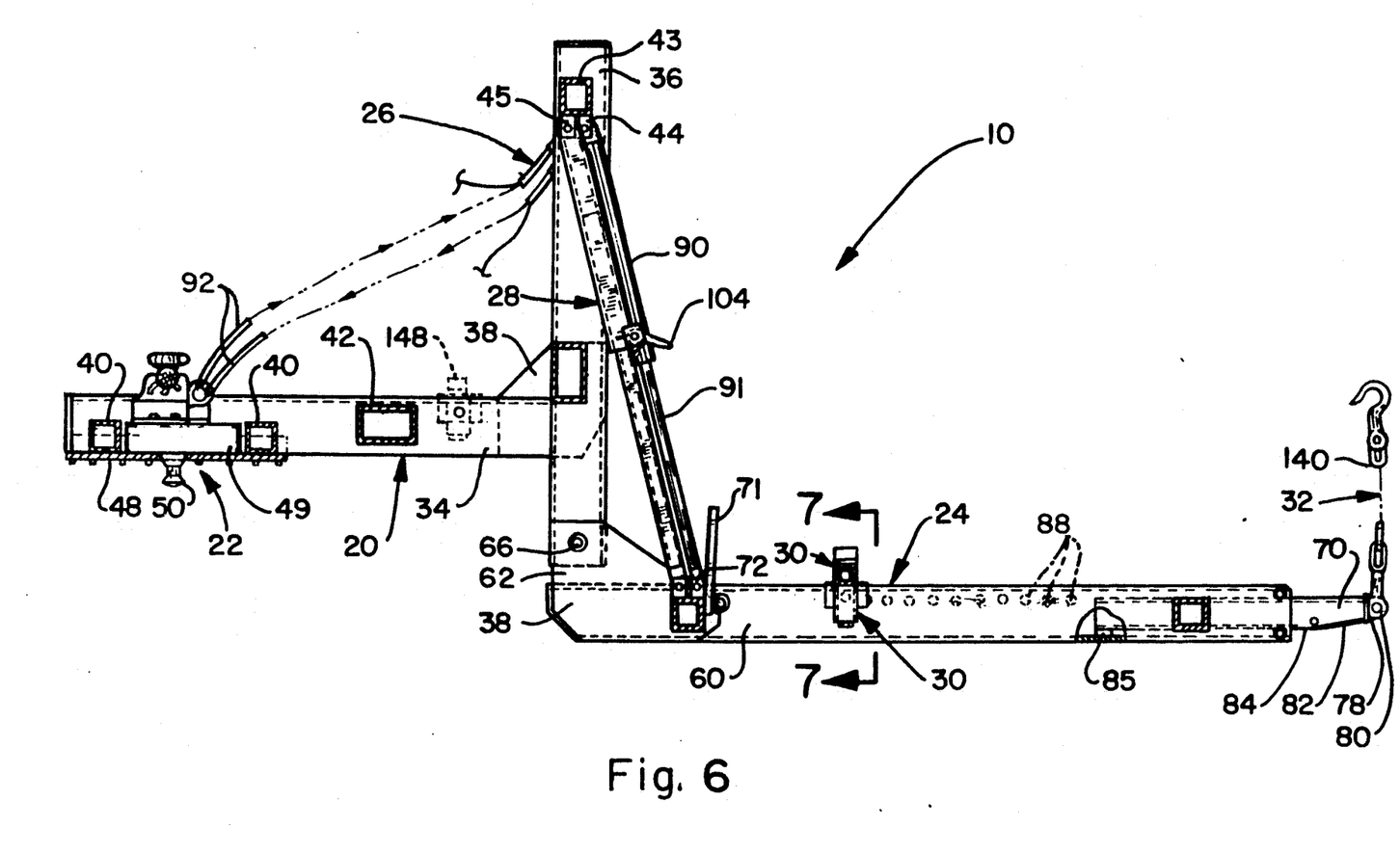
FIG. 6 is a sectional view of the boom assembly of FIG. 5, taken along the line 6—6 thereof.

With additional reference to FIGS. 5 and 6, the boom assembly 10 generally comprises a main frame 20 which carries a fifth wheel attachment assembly 22. The attachment assembly 22 mounts to the fifth wheel 12 of the tractor in a conventional fashion. A lift leg assembly 24 is pivotally mounted to the lower portion of the main frame. The pivotal position of the leg assembly 24 relative to the main frame 20 is controlled by a hydraulic unit 26 and a cooperative lock sub-assembly 28. A removable and variably positionable receiver 30 is mounted to the leg assembly for engaging the underside front portion of the truck. A second securement assembly 32 attaches to the truck frame rearwardly of the vehicle cab from a rear terminal portion of the leg assembly.

Figure 11:
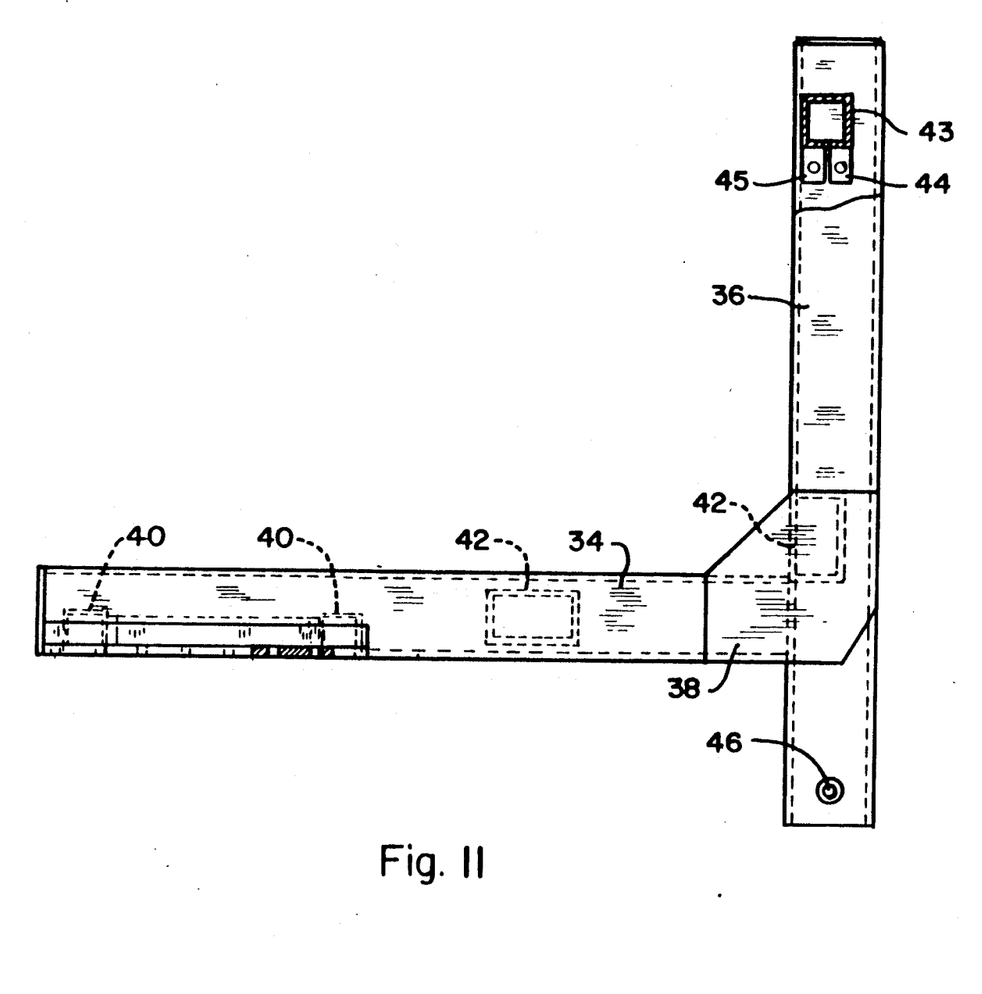
FIG. 11 is a side elevational view, partly in phantom, partly broken away and partly in section, of the frame assembly of the boom assembly of FIG. 6.
Figure 12:
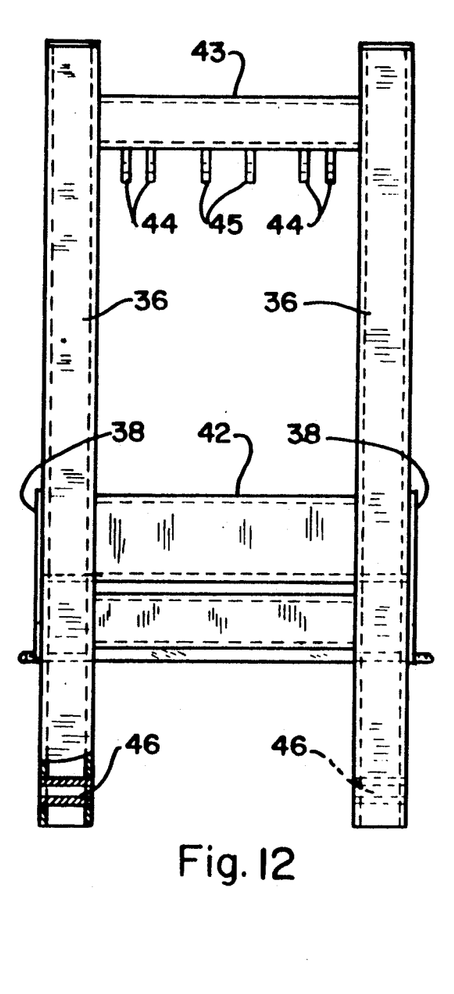
FIG. 12 is a front elevational view, partly in phantom and partly broken away, of the main frame assembly of FIG. 11, viewed from the right thereof.

The main frame 20 comprises a pair of laterally spaced beams 34 which connect at one end with a pair of uprights 36 at an intermediate location of the uprights. The uprights and beams are fixedly disposed in perpendicular relationship. With additional reference to FIGS. 11 and 12, polygonal-shaped joining plates 38 are welded to the beams and the uprights for joining the members. Laterally extending cross beams 40 and 42 extend between the beams and the uprights to lend stability to the main frame. The beams, uprights and cross beams are preferably heavy duty tubular steel members. A cross beam 43 is also mounted at an upper location of the uprights. Laterally spaced pairs of connecting ears 44 having aligned openings and an intermediate pair of connecting ears 45 having aligned openings disposed between the outer pair of ears extend downwardly from the cross beam 43. An opening 46 is formed in the lower portion of the uprights to implement the pivotal connection with the leg assembly 24.

The fifth wheel attachment assembly 22 is mounted to the main frame between beams 34 and cross beams 40 toward the front of the main frame. The fifth wheel attachment assembly comprises a plate 48 which is bolted to the underside of the beams 34. A block 49 mounting a kingpin 50 for coupling with the fifth wheel is mounted to the plate. The kingpin 50 which has a conventional form projects from the underside of the plate 48 and couples with the fifth wheel 12 in a conventional manner.

Figure 9:
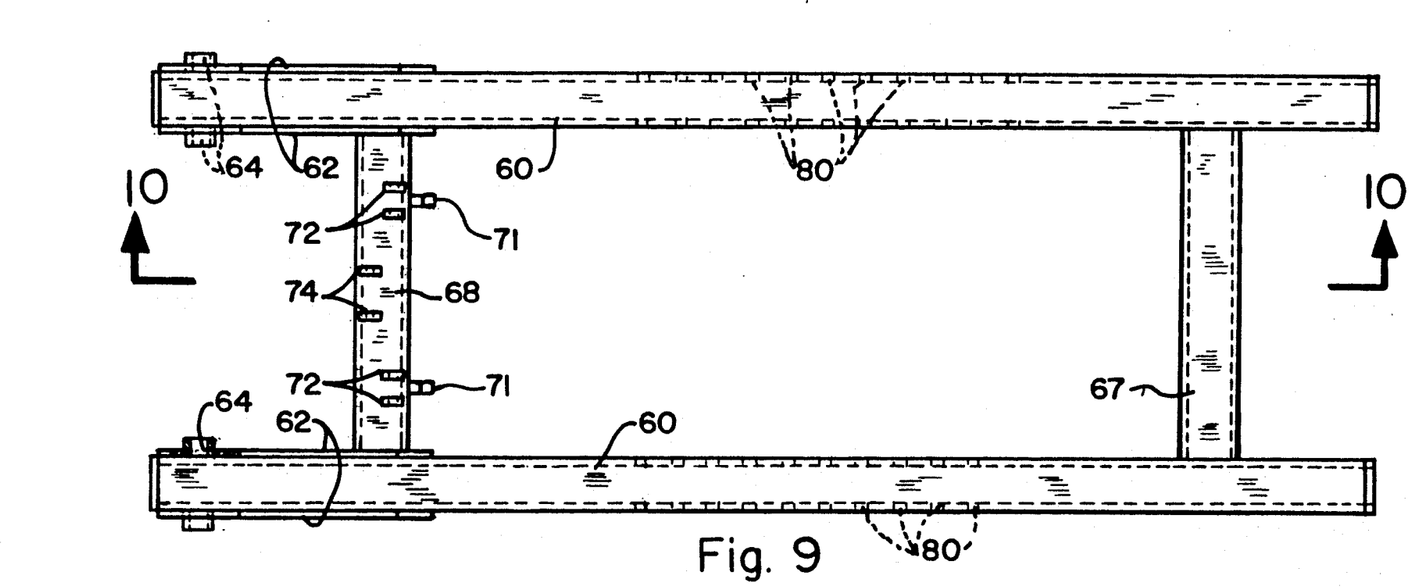
FIG. 9 is a fragmentary top plan view, partly in phantom, of a leg assembly of the boom assembly of FIG. 5.
Figure 10:
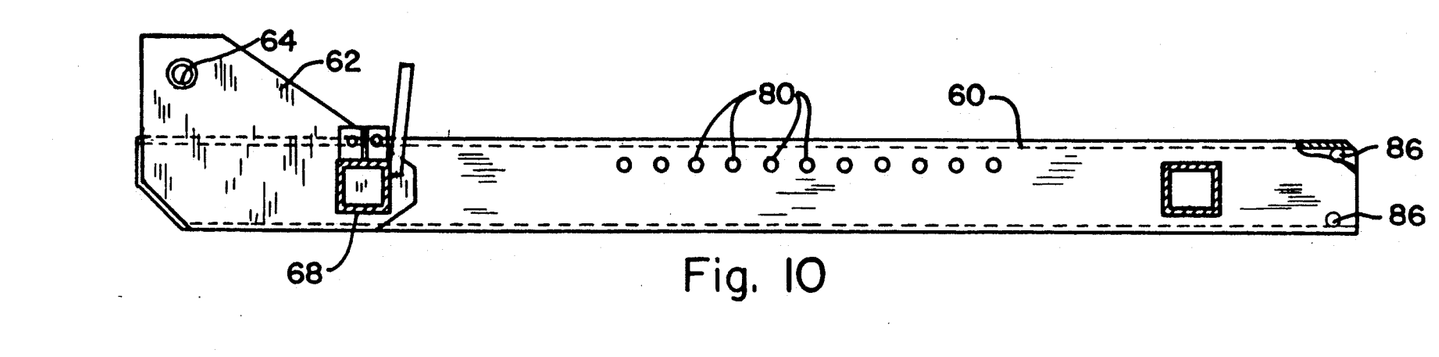
FIG. 10 is a sectional view, partly broken away and partly in phantom, of the leg assembly of FIG. 9, taken along the line 10—10 thereof.

With additional reference to FIG. 9 and 10, the lift leg assembly 24 comprises a pair of steel tubular legs 60. A pair of wing plates 62 are mounted at a frontal portion to each of the legs. The wing plates 62 project upwardly from the legs 60 to form a pair of laterally spaced yokes. An aperture 64 in each of the wing plates is alignable with the openings 46 of the uprights. A pivot pin 66 is secured in the aligned apertures 64 and openings 4 for pivotally connecting the leg assembly with the main frame. The wing plates 62 and the resulting offset location of the pivotal connection allow the lift leg assembly 24 to gain ground clearance upon the boom assembly being transformed to the retracted configuration of FIG. 1 or the extended configuration of FIG. 4.

A cross beam 68 connects between inner sides of the legs. Pairs of ears 72,74 are welded to the upper surface of the cross beam and project upwardly in general lateral alignment with the ears 45, 44. Anchor rings 69 for anchoring chains are rigidly mounted at opposing sides of each of the legs at positions adjacent the ends of cross beam 68.

Figure 13:
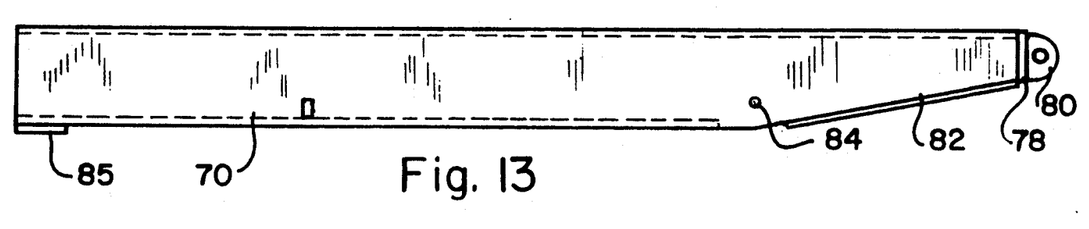
FIG. 13 is a side elevational view, partly in phantom, of the leg assembly of the boom assembly of FIG. 6.
Figure 14:
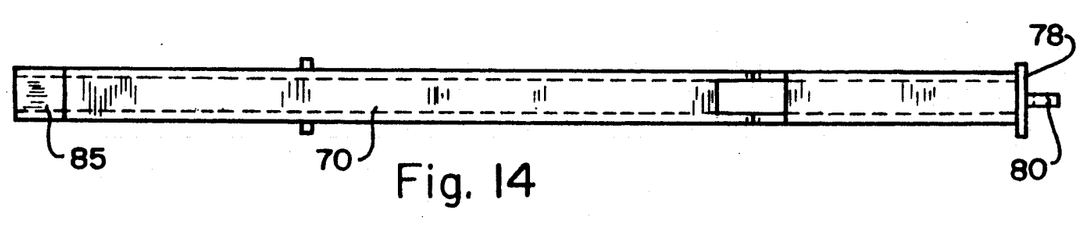
FIG. 14 is a bottom view, partly in phantom, of the leg assembly of FIG. 13.
Figure 15:
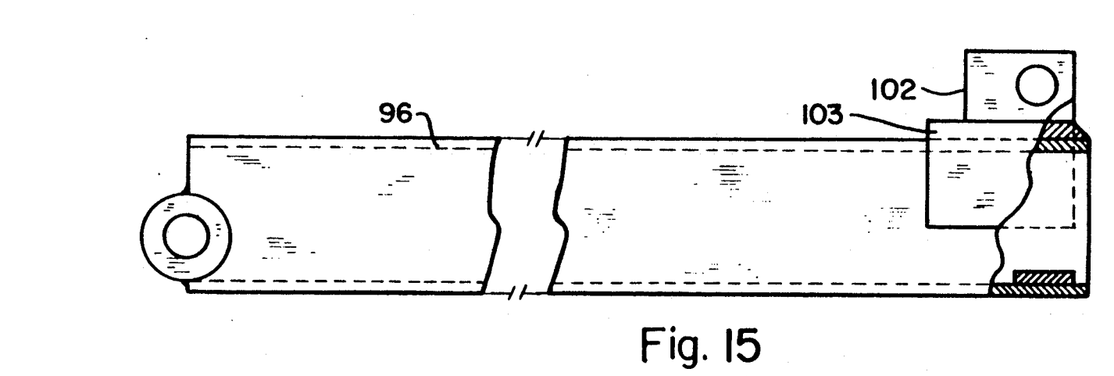
FIG. 15 is an enlarged side view, partly in phantom, partly broken and partly in section, of a portion of the lock sub-assembly of FIG. 8.
Figure 16:
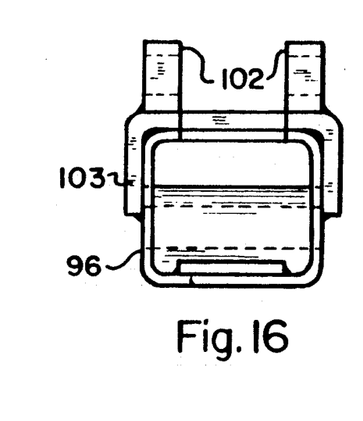
FIG. 16 is an end view, partly in phantom, of the lock sub-assembly portion of FIG. 15 viewed from the right end thereof.
Figure 17:
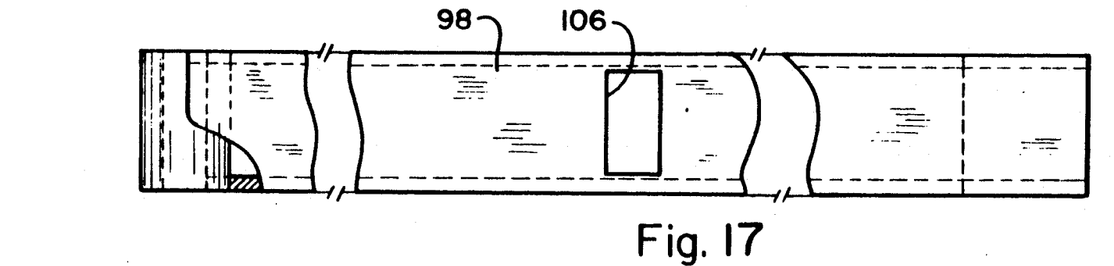
FIG. 17 is a generally frontal view, partly in phantom, partly broken away and partly in section, of a second portion of the lock sub-assembly of FIG. 8.
Figure 18:
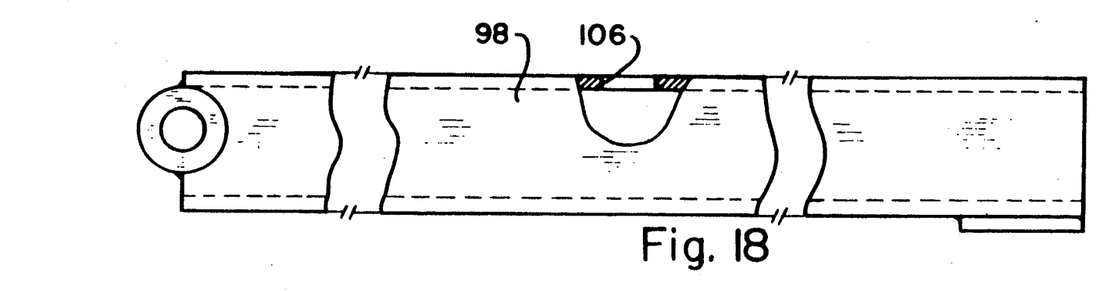
FIG. 18 is a side elevational view, partly in phantom, partly broken away and partly in section, of the lock sub-assembly portion of FIG. 17.
Figure 19:
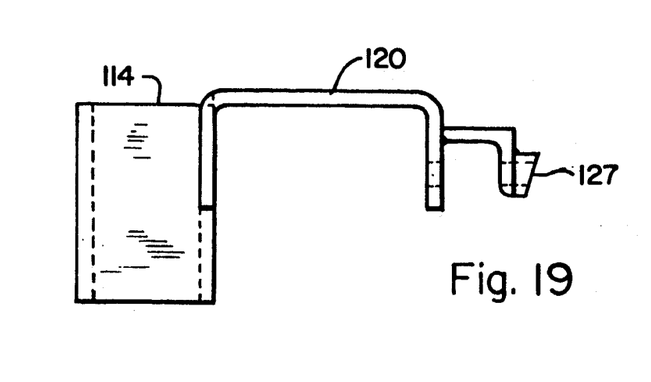
FIG. 19 is an elevational view of a receiver employed with the boom assembly of FIG. 6.
Figure 20:
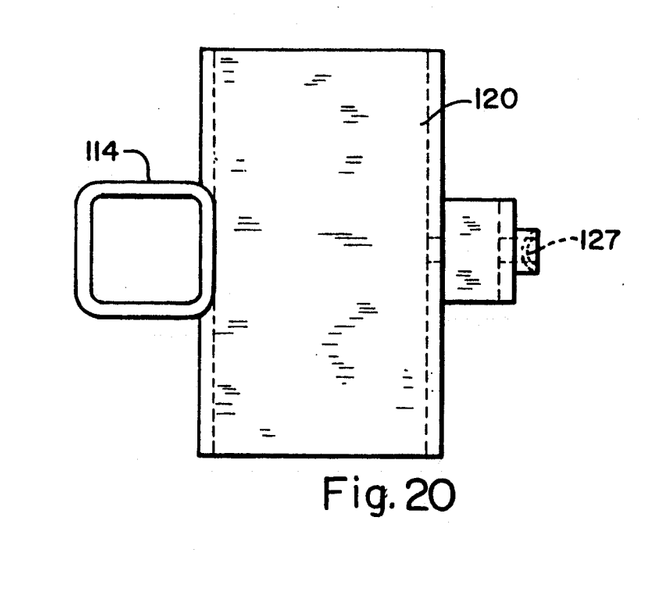
FIG. 20 is a top plan view, partly in phantom, of the receiver of FIG. 19.
Figure 21:
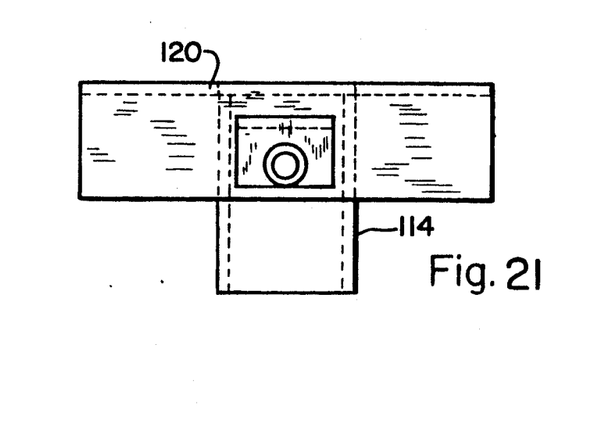
FIG. 21 is a side view, partly in phantom, of the receiver of FIG. 19, viewed from the right thereof.
Figure 22:
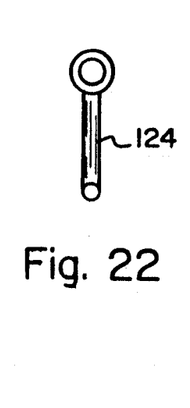
FIG. 22 is a side view of a handle for the receiver of FIG. 19.
Figure 23:
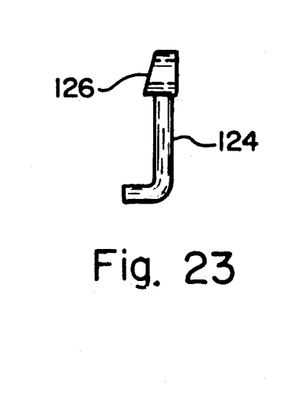
FIG. 23 is an end view, partly in phantom, of the handle of FIG. 22.

With additional reference to FIGS. 13 and 14, a telescopic extension 70 is slidably received by each leg through the rear end thereof. The extension 70 is linearly positionable to extend the effective length of the assembly in accordance with the dimensional constraints of the vehicle to be towed. The rear portion of the extension is upwardly tapered. A plate 78 is welded across the rear end of the extension. An anchoring ring 80 is welded to the plate. A second plate 82 is also welded at the near underside of the extension. A stop pin 84 projects from the extension side and interferes with the end of the leg to limit the inward telescopic position of the extension. A pair of centering bars 86 are disposed at an inner rear end location of the leg for centering the extension. A steel strip 85 welded at the front underside of the extension interferes with the lower centering bar 86 to retain the extension 70 with the receiving leg 60. A cross member 67 extends at a rear position between the legs to enhance the structural integrity of the leg assembly. A linear row of openings 88 is formed along the sides of the legs for anchoring the receiver 30, as will be detailed below.

The hydraulic unit 26 comprises a pair of hydraulic cylinders 90 which are pivotally mounted to ears 44 for pivoting about a horizontal transverse axis. A reciprocating piston drives a rod 91 which is pivotally mounted to ears 72 for pivoting about a second horizontal transverse axis. A suitable hydraulic cylinder 90 is a Prince hydraulic cylinder having a four inch bore and a forty-eight inch stroke. Naturally, other hydraulic cylinders may be suitable. Hydraulic lines 92 connecting the cylinders may connect with the hydraulic lines of the tractor. The hydraulic cylinders 90 function to retract and extend the leg assembly to thereby define the angle between the main frame, i.e, uprights 36, and the legs 60 which are positionable under the vehicle to be towed. In particular, the cylinders 90 are actuatable to expand the boom assembly from the folded non-towing mode of FIG. 1 to the attachment configuration of FIGS. 2 and 3 and to the extended towing configuration of FIG. 4. It will be appreciated that the extended towing configuration is obtained by using the hydraulic forces to expel the piston rod 91 to an extended position. A pair of vertical bumper strips 71 may be welded to beam 68 and project upwardly at the rear of the rods 91 to protect the cylinders and rods from impact by the towed vehicle.

Figure 4:
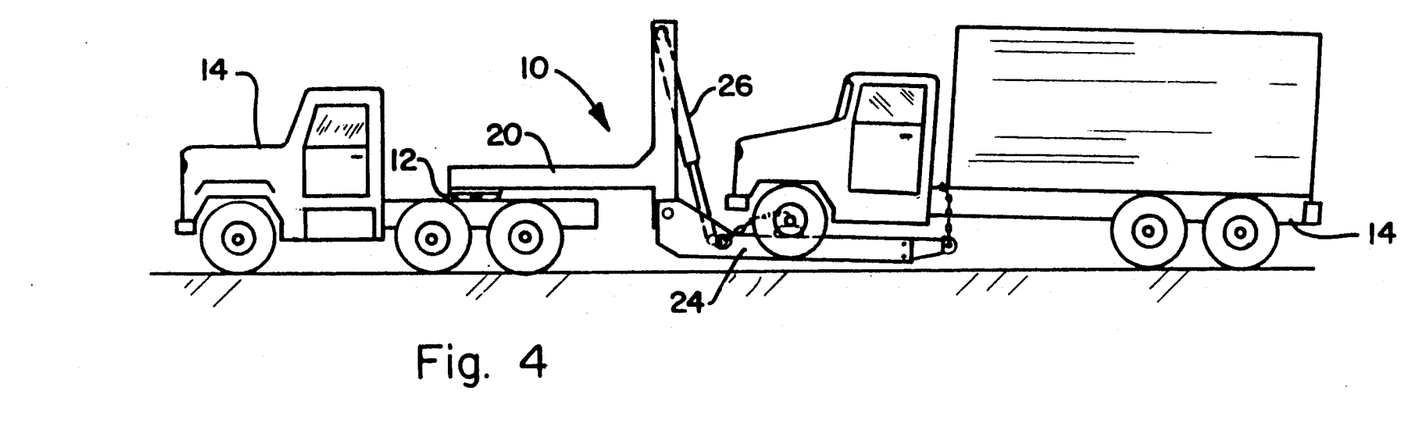
FIG. 4 is a side elevational view of the tractor, boom assembly and truck of FIG. 3, illustrating the boom assembly in the towing mode.
Figure 24:
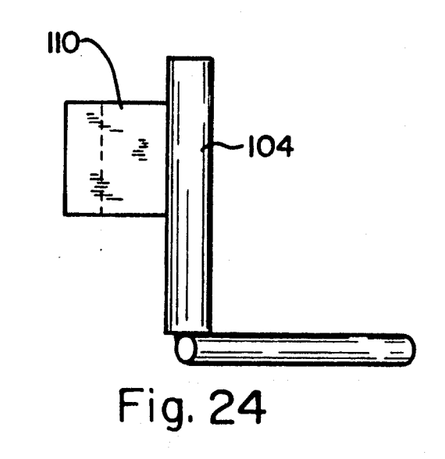
FIG. 24 is an enlarged top view of a lock lever employed in the lock sub-assembly of FIG. 8.
Figure 25:
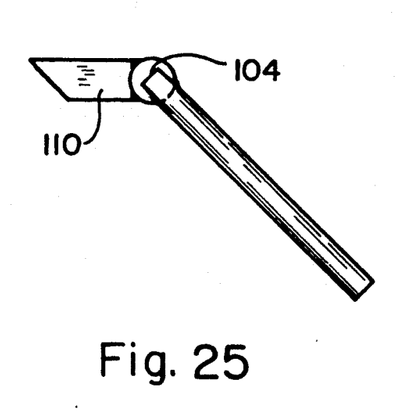
FIG. 25 is a side view of the lock lever of FIG. 24.

The lock sub-assembly 28 functions to lock the boom assembly in the extend towing position of FIG. 4 in a quasi-self-locking fashion. With reference to FIG. 8 and FIGS. 15-18, the lock sub-assembly includes an outer tube 96 and an inner telescopic tube 98. The tubes 96, 98 preferably have a square section. The extreme ends of the tubes 96 and 98 have transverse openings or sleeves for receiving pins or bolts to pivotally connect the tubes to respective ears 45 and 74. A pair of ears 102 project from a U-shaped bracket 103 which is welded to the outer tube 96 for mounting a latch lever 104 (FIGS. 24 and 25). The inner tube has a rectangular slot 106 which is dimensioned and positioned with respect to a lower end recess 108 of the outer tube so that a wedge-shaped latch 110 essentially drops through into the slot 106 and is captured against the end recess 108 to lock the telescopic tube assembly at the extended lock position during towing. The latch lever may be manually rotated to withdraw the latch 110 from the slot to release the lock.

Prior to towing the vehicle, the leg assembly 24 is positioned beneath the front end of the vehicle. The receiver 30 engages under the front wheels and/or I-beam of the vehicle. The rear securement assembly 32 secures the vehicle frame at the rear end of the leg assembly. The vehicle is thus preferably secured to the leg assembly 24 at two longitudinally spaced pairs of laterally opposed positions. Two longitudinally spaced securements are illustrated in FIGS. 3 and 4.

Figure 7:
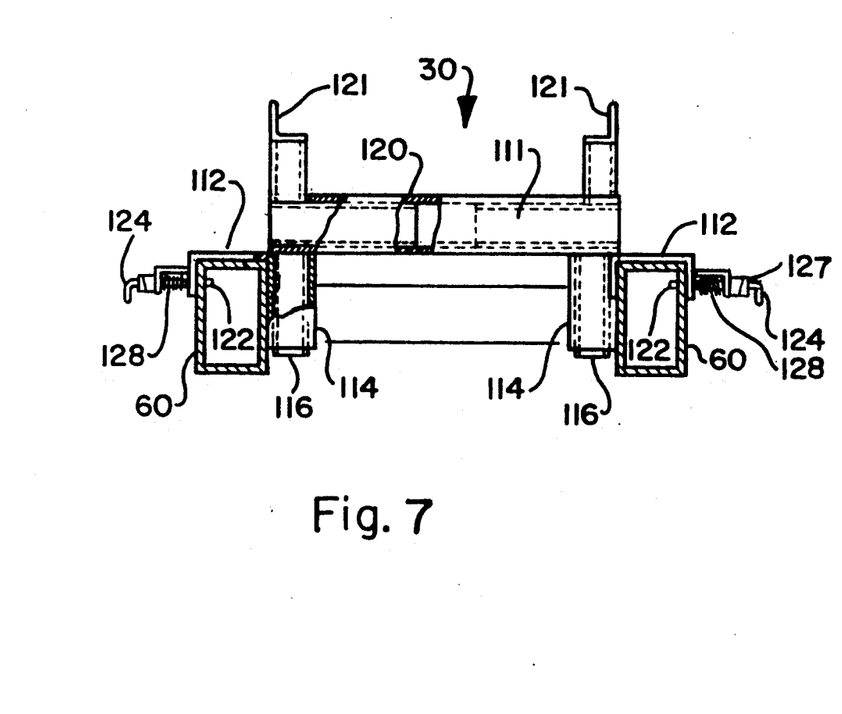
FIG. 7 is a sectional view of the boom assembly of FIG. 6, taken along the line 7—7 thereof.
Figure 8:
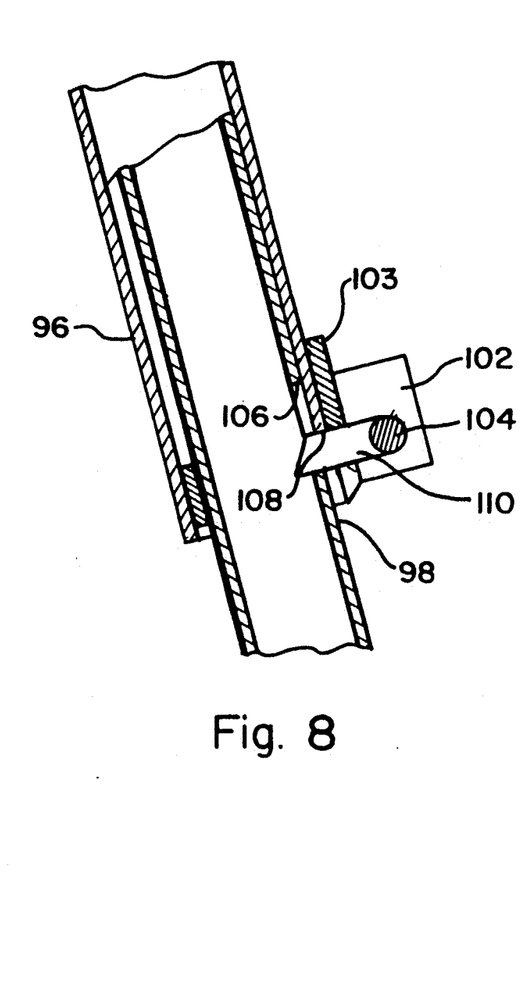
FIG. 8 is an enlarged fragmentary sectional view of a lock sub-assembly for the boom assembly of FIG. 5, taken along the line 8—8 thereof.

The receiver 30 may assume a wide variety of shapes, dimensions and configurations in accordance with the specific vehicle to be towed. With reference to FIG. 7, receiver 30 is adapted to engage the underside of the vehicle leaf spring (not illustrated) and laterally retain the leaf spring. Receiver 30 is especially adapted for vehicles having a front drive axle. The receiver is positioned and secured to the legs 60 by a laterally adjustable bracket 111, which is configured for retention by laterally opposed bases 112 (FIGS. 19-23). The bases 112 are dimensioned and positionable to slide along the upper portion of the legs 60. A rectangular tube 114 at the inside of the base forms a vertical socket for receiving a locating foot 116 of the bracket 111. The bracket has a laterally variably positionable telescopic cross support 120. A support strut projects upwardly from the cross support 120 and includes opposed inverted L-shaped retaining catches 121 which engage the underside of the vehicle leaf string and also the side of the leaf spring to retain the front portion of the vehicle in proper position to the leg assembly. The support is adjustable to accommodate a wide range of vehicle configurations. A chain 123 (partially illustrated in FIG. 5) attached to a ring 69 is then wrapped around the leaf spring or other structure at the underside of the vehicle in the vicinity of the front wheel and tightened for retaining the front wheel portion of the vehicle to the receiver.

The position of each base 112 is fixed by a lock pin 122 which is dimensioned and alignable for insertion into a selected opening 88 of the leg. An outer handle 124 (FIGS. 22 and 23) is angularly rotatable for engaging between a movable cam surface 126 and a fixed cam surface arrangement 127 for withdrawing the pin against the loaded bias of a spring 128 urging the lock pin 122 inwardly, to thereby release the pin for positioning the receiver.

Figure 26:
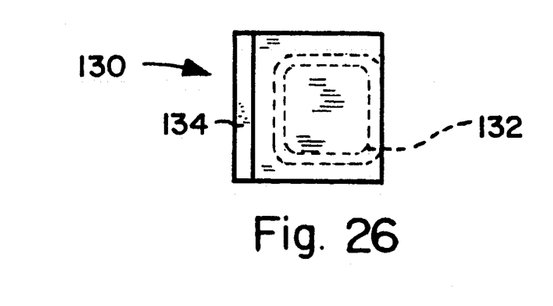
FIG. 26 is a top view, partly in phantom, of a receiver which may be employed in the boom assembly of FIG. 5.
Figure 27:
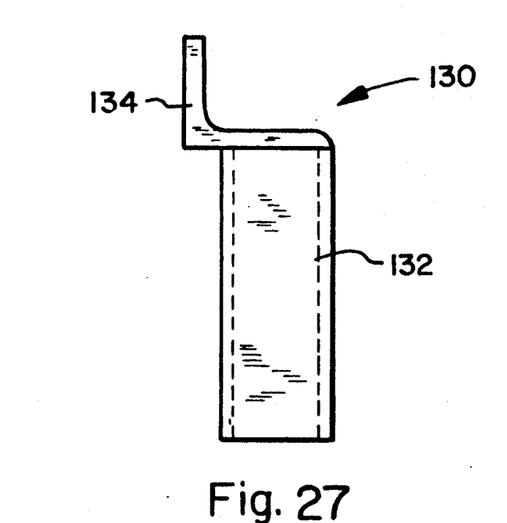
FIG. 27 is a side view, partly in phantom, of the receiver of FIG. 26.

Alternately, as illustrated in FIGS. 26 and 27, the receiver 130 may take the form of a foot 132 which is inserted into the socket 114. An L-shaped flange 134 mounted at the top of the foot engages the front side of the front wheel I-beam. The chain 123 is then secured around the I-beam and tightened to forwardly engage the I-beam against the flange for securing the front portion of the wheel to the I-beam.

The rear securement sub-assembly 32 comprises a chain 140 which attaches to each of the rings 80. Each chain 140 wraps preferably around the top of the vehicle frame behind the cab and is tightened to secure the vehicle frame to the extension portion of the leg. No pinning or other mechanism is required to fix the position of the extension relative to the receiving leg 60. Alternately, a single chain may wrap across the top of the vehicle frame and be tightened through each of the rings 80.

Various receivers schematically designated as numeral 148 which are designed for specific vehicle constraints may be provided to provide an appropriate range of structures for effectively securing the front wheel portion of the vehicle to the leg assembly. Such receivers 148 may be secured to the beams of the main frame, such as illustrated in FIG. 6. When the boom is retracted to the non-towing configuration of FIG. 1, the receiver 30 is mounted to beams 34.

With reference to FIGS. 1-4, the boom assembly 10 operates in a very efficient manner. In the folded non-towing mode of FIG. 1, a blocking 150 mounted between the beams 34 and the rear frame of the tractor is required to support the boom assembly. The blocking 150 is removed during the towing operations. The mounted boom assembly is transported to the location of the vehicle to be towed. The hydraulic unit 26 is actuated to extend the leg assembly so that the legs essentially rest on the roadway or pavement forwardly and adjacent to the front end of the vehicle. The leg assembly 24 is then positioned under the frame of the vehicle as best illustrated in FIG. 3. The vehicle essentially is secured to the leg assembly at two laterally opposed longitudinal positions, i.e., four discrete positions—two by means of chains 123 at the receiver 30 and two at the rear securement means 32 by means of chains 140. The vehicle attachment locations are adjacent the front wheel and behind the vehicle cab at the top of the frame. Although four attachment points are desired, the boom assembly would effectively operate with only a front and rear attachment of the vehicle to the leg assembly.

After the attachment has been completed, the cylinders 90 are then actuated to force the piston rods 91 to an extreme extended position illustrated in FIG. 4. The engagement of the vehicle to the leg assembly forces the boom assembly to an elevated position so that the legs 60 are essentially forced to lift from the roadway with the front end of the vehicle. The vehicle is towed via the rear wheels but there is a significant force distribution relationship between the towed vehicle, the boom assembly and the tractor. The distribution of the downward force exerted through the front end of the vehicle is such that an insubstantial force acts downwardly at the rear of the tractor to pivot the tractor frame about the rear tractor wheels. Thus, the front end of the tractor does not tend to forcibly lighten or be forced upwardly as is common in other numerous booms. The vehicle is then towed in a trailer-type fashion which is somewhat akin to having all of the towed vehicle wheels on the pavement. The pivot range allowed by the fifth wheel, provides a limited pivoting point wherein the vehicle may be towed in an efficient and safe manner, regardless of the quality of pavement.

When the extreme extended position of the boom assembly is attained, i.e., the FIG. 4 towing configuration, the lock sub-assembly automatically falls into a locked configuration wherein the latch 110 drops into the slot 106. The hydraulic forces on the cylinders 90 may be released during the towing process so that extreme forces are not exerted on the hydraulic cylinders, and in particular the heads, during the towing. It will be appreciated that the extensions 70 of the leg assembly do not require any pinning or position fixing mechanism as such. The transformation to the extreme pivot position actually results in a lifting of the boom assembly due to the multiple attachment points to gain ground clearance for travel during the towing. Moreover, the hydraulic cylinders are used in an efficient and optional manner which does not result in excessive pressures being exerted on the hydraulic heads.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A boom assembly for towing vehicles comprising:
   main frame means comprising a pair of spaced beams and upright frame means comprising a pair of spaced uprights extending generally perpendicular thereto;
   attachment means mounted to said main frame means for attaching said main frame means to a fifth wheel;
   lift leg means comprising a pair of lift legs pivotally mounted at a lower portion of said uprights to define a leg pivot axis and having a rear terminal end;
   first securement means for engaging the underside of the front wheel portion of the vehicle to said lift leg means;
   second securement means for securing a portion of the vehicle frame which is longitudinally spaced from said front wheel portion to said lift leg means;
   hydraulic means pivotally connecting said upright frame means and said lift leg means at a position disposed between said pivot axis and said rear terminal end for pivoting said legs at a first retracted position, a second extended position wherein said legs essentially rest on the ground when the main frame means is mounted to a fifth wheel, and a third extended position having an angle greater than the second position which forces the legs to an elevated position when the vehicle is secured to the first and second securement means of said leg means, said hydraulic means comprising a hydraulic cylinder having an associated piston rod wherein said rod is retracted into the cylinder in the retracted position and is projected from the cylinder in the extended position; and
   lock means extending between said upright frame means and said leg means for locking said legs at said third pivot position.

2. The boom assembly of claim 1 wherein said lift leg means further comprises an extension member slidably receivable in each of said lift legs and variably positionable relatively thereto.

3. The boom assembly of claim 2 wherein said second securement means are mounted to said extension members.

4. The boom assembly of claim 1 wherein said lock means comprises a pair of telescopic tubes and a latch mounted to one of said tubes for locking the tubes at a selected position.

5. The boom assembly of claim 4 wherein the other said tube has a slot and at said selected position the latch drops into said slot.

6. The boom assembly of claim 1 wherein said hydraulic means comprises a pair of hydraulic cylinders each having an associated piston rod, said cylinders being mounted to said main frame means and said rods being mounted to said leg means.

7. The boom assembly of claim 1 wherein said first securement means comprises a base which is selectively fixedly positionable at a range of selected positions of said leg means.

8. The boom assembly of claim 1 wherein said second securement means comprises a chain.

9. The boom assembly of claim 1 wherein in said retracted position said uprights and said legs extend in generally parallel relationship.

10. A boom assembly for towing vehicles comprising:
    main frame means comprising a pair of spaced beams and a pair of spaced uprights extending generally perpendicular thereto;
    attachment means mounted to said main frame means for attaching said main frame means to a fifth wheel;
    lift leg means comprising a pair of lift legs pivotally mounted at a lower portion of said uprights and having a rear terminal end;
    first securement means for engaging the underside of the front wheel portion of the vehicle to said lift leg means, said first securement means comprising a base selectively fixedly positionable at a range of selected positions of said leg means, said base further comprising a socket, said first securement means comprising a bracket mounting a retainer flange and having a foot insertable in said socket;

second securement means for securing a portion of the vehicle frame which is longitudinally spaced from said front wheel portion to said lift leg means;

hydraulic means pivotally connecting said main frame means and said lift leg means for pivoting said legs at a first retracted position, a second extended position wherein said legs essentially rest on the ground when the main frame means is mounted to a fifth wheel, and a third extended position having an angle greater than the second position which forces the legs to an elevated position when the vehicle is secured to the first and second securement means of said leg means; and lock means extending between said main frame means and said leg means for locking said legs at said third pivot position.

11. The boom assembly of claim 10 wherein said legs each define a row of openings and said base further comprises a spring loaded pin insertable in said openings.

12. The boom assembly of claim 10 wherein said first securement means further comprises a chain connecting a leg and attachable for securing a portion of the vehicle against said flange.

13. A boom assembly for towing vehicles comprising:
main frame means comprising a beam structure and an upright structure extending generally perpendicular thereto;
attachment means mounted to said main frame means for attaching said main frame means to a fifth wheel;
lift leg means pivotally mounted at a lower portion of said upright structure and having a rear terminal end;
first securement means for engaging the underside of the front wheel portion of the vehicle to said lift leg means;
second securement means for securing a portion of the vehicle frame which is longitudinally spaced from said front wheel portion to said lift leg means;
hydraulic means pivotally connecting said upright structure and said lift leg means rearward of said upright structure for pivoting said leg means at a first retracted position, a second extended position wherein said leg means rests on the ground when the main frame means is mounted to a fifth wheel, and a third extended position having an angle greater than the second position which forces the leg means to an elevated position when the vehicle is secured to the first and second securement means of said leg means, said hydraulic means comprising a hydraulic cylinder having an associated piston rod wherein said rod is retracted into the cylinder in the retracted position and is projected from the cylinder in the extended position; and lock means extending between said main frame means and said leg means at said third pivot position.

14. The boom assembly of claim 13 wherein said lock means comprises a pair of telescopic tubes and a latch mounted to one of said tubes for locking the tubes at a selected position.

15. The boom assembly of claim 13 wherein said lift leg means further comprise a pair of legs and an extension member slidably receivable in each of said legs and variably positioned relatively thereto.

16. The boom assembly of claim 10 wherein said hydraulic means comprises a hydraulic cylinder having an associated piston rod wherein said rod is retracted into the cylinder in the retracted position and projected from the cylinder in the extended position.

17. The boom assembly of claim 13 wherein said lift leg means comprises a pair of legs and said lift leg means is pivotally mounted to said upright structure in generally offset relationship to said legs.

18. A boom assembly for towing vehicles comprising:
main frame means comprising a beam structure and an upright structure extending generally perpendicular thereto;
attachment means mounted to said main frame means for attaching said main frame means to a fifth wheel;
lift leg means comprising at least one leg, an offset structure extending from said leg and pivot means for mounting said leg in offset relationship at a lower portion of said upright structure;
first securement means for engaging the underside of the front wheel portion of the vehicle to said lift leg means;
second securement means connected to said lift leg means for securing a portion of the vehicle frame to said lift leg means, said first securement means being located between said pivot means and said second securement means;
hydraulic means connecting said main frame means and said lift leg means for pivoting said leg means at a first retracted position above the ground wherein the lift leg means has a generally upright orientation when the attachment means is mounted to a fifth wheel, a second extended position wherein said leg means rests on the ground when the attachment means is mounted to the fifth wheel, and a third extended position having an angle greater than the second position which forces the leg means to an elevated position above the ground when the attachment means is mounted to the fifth wheel and the vehicle is secured to the first and second securement means of said leg means.

19. The boom assembly of claim 18 wherein said offset structure comprises a pair of wing plates and said plates define a pair of aligned openings in offset relationship to said leg and said pivot means comprises a pin extending through said openings.

20. The boom assembly of claim 19 wherein said hydraulic means comprises a pair of hydraulic cylinders having associated piston rods which project from said cylinders in the extended position and further comprising lock means extending between said main frame means and said leg means for locking said leg means at said third pivot position.

21. A boom assembly for towing vehicles comprising:
main frame means comprising a beam structure and an upright structure extending generally perpendicular thereto;
attachment means mounted to said main frame means for attaching said main frame means to a fifth wheel;
lift leg means pivotally mounted at a lower portion of said upright structure and having a rear terminal end;
first securement means for engaging the underside of the front wheel portion of the vehicle to said lift leg means;
second securement means for securing a portion of the vehicle frame which is longitudinally spaced from said front wheel portion to said lift leg means;

hydraulic means pivotally connecting said upright structure at a location above said beam structure and said lift leg means for pivoting said leg means at a first retracted position, a second extended position wherein said leg means rests on the ground when the main frame means is mounted to a fifth wheel, and a third extended position having an angle greater than the second position which forces the leg means to an elevated position when the vehicle is secured to the first and second securement means of said leg means, said hydraulic means comprising a hydraulic cylinder having an associated piston rod wherein said rod is retracted into the cylinder in the retracted position and is projected from the cylinder in the extended position; and lock means extending between said main frame means and said leg means at said third pivot position.

* * * * *